(12) United States Patent
Miyajima

(10) Patent No.: US 9,819,857 B2
(45) Date of Patent: Nov. 14, 2017

(54) ELECTRONIC APPARATUS, CONTROL METHOD FOR THE SAME, AND IMAGE CAPTURING APPARATUS

(71) Applicant: CANON KABUSHIKI KAISHA, Tokyo (JP)

(72) Inventor: Takuro Miyajima, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/245,681

(22) Filed: Aug. 24, 2016

(65) Prior Publication Data
US 2017/0064194 A1   Mar. 2, 2017

(30) Foreign Application Priority Data

Aug. 28, 2015 (JP) ................................. 2015-169722

(51) Int. Cl.
*H04N 5/232* (2006.01)
*G06F 3/0482* (2013.01)
*G06F 3/0484* (2013.01)

(52) U.S. Cl.
CPC ..... *H04N 5/23216* (2013.01); *H04N 5/23245* (2013.01); *H04N 5/23293* (2013.01); *G06F 3/0482* (2013.01); *G06F 3/04847* (2013.01); *G06F 2203/04803* (2013.01)

(58) Field of Classification Search
None
See application file for complete search history.

(56) References Cited

U.S. PATENT DOCUMENTS

| | | | |
|---|---|---|---|
| 2011/0058085 A1* | 3/2011 | Ito | G03B 13/00 348/333.02 |
| 2014/0365854 A1* | 12/2014 | Karunamuni | G06F 3/0482 715/205 |
| 2015/0227308 A1* | 8/2015 | Kim | G06F 3/0486 715/769 |
| 2016/0132206 A1* | 5/2016 | Kawaguchi | H04N 5/23216 715/845 |
| 2016/0147390 A1* | 5/2016 | You | H04W 4/005 715/740 |
| 2016/0191800 A1* | 6/2016 | Yoshikawa | H04N 5/23293 348/220.1 |
| 2016/0323493 A1* | 11/2016 | Matsuhashi | H04N 5/23293 |

FOREIGN PATENT DOCUMENTS

JP   2010-152882 A   7/2010
JP   2012-129963 A   7/2012

* cited by examiner

*Primary Examiner* — Shahbaz Nazrul
(74) *Attorney, Agent, or Firm* — Cowan, Liebowitz & Latman, P.C.

(57) ABSTRACT

An electronic apparatus includes a setting unit configured to set a display item to be displayed on a setting screen; a mode setting unit configured to set a mode from among a plurality of modes; and a display control unit configured to display the setting screen in accordance with the mode set by the mode setting unit and the display item set by the setting unit. The setting screen of the electronic apparatus has a first area for displaying display items that differ for each mode, and a second area for displaying display items that are displayed in a plurality of modes.

21 Claims, 11 Drawing Sheets

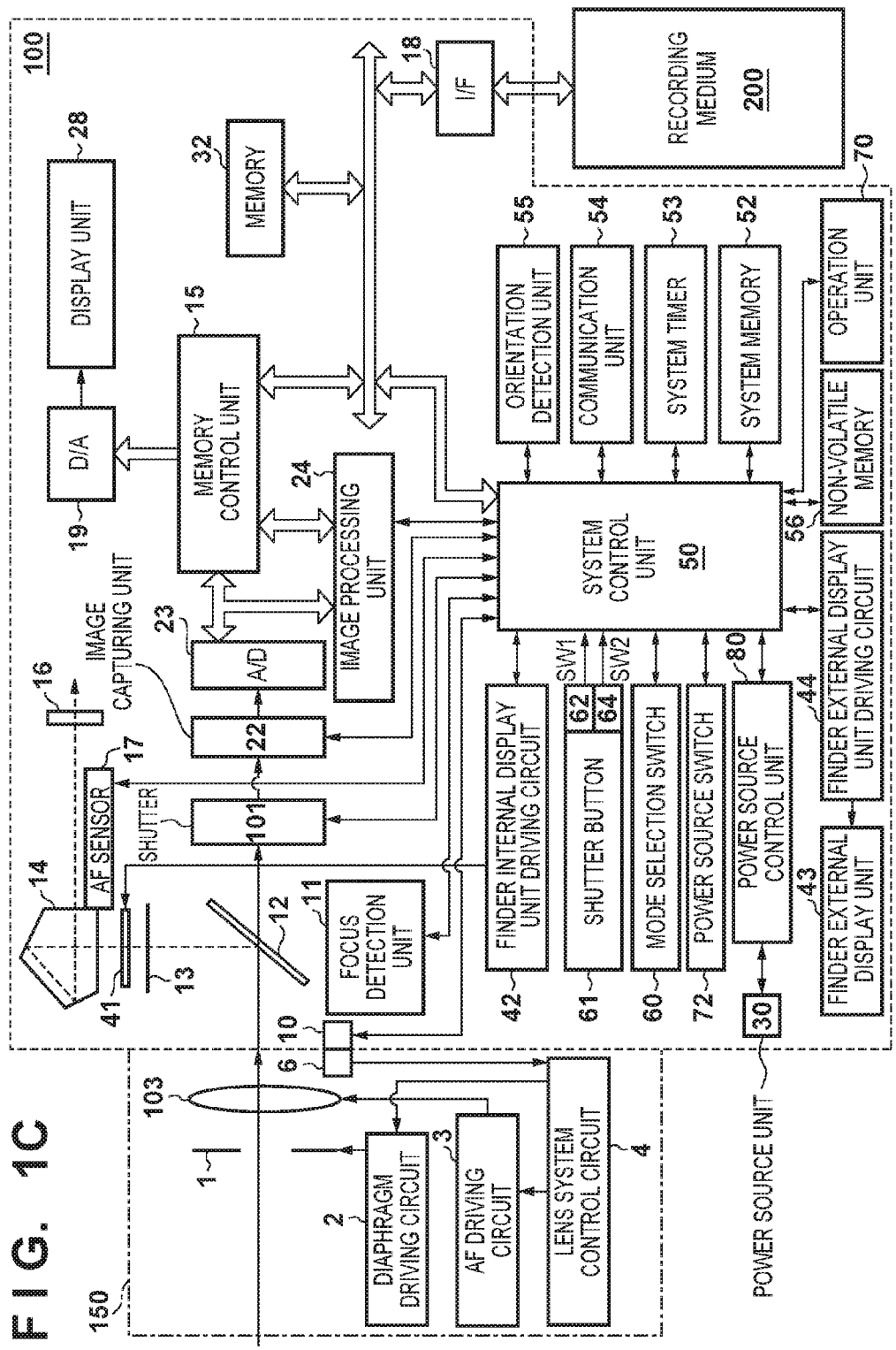

ELECTRONIC APPARATUS, CONTROL METHOD FOR THE SAME, AND IMAGE CAPTURING APPARATUS

BACKGROUND OF THE INVENTION

Field of the Invention

The present invention relates to an electronic apparatus according to which it is possible to customize a setting screen on which a user instructs checking of an operation state of the apparatus or operation setting, a control method for the same, and an image capturing apparatus.

Description of the Related Art

In general, in an electronic apparatus, a setting screen according to which a user gives instructions to check the operation state of the apparatus or perform operation settings to the apparatus is prepared. Also, with such an electronic apparatus, a configuration is known which makes it easier for a user to use the setting screen or enables customization according to the user's preference.

Japanese Patent Laid-Open No. 2012-129963 discloses a digital camera according to which it is possible to customize objects to be displayed for each setting item, such as quality (recording quality), flash, white balance, and focus mode. Also, Japanese Patent Laid-Open No. 2010-152882 discloses a configuration in which display items for machining tools are customized, whereby at the time of customization screen setting, only enabled items are displayed in a mode selected from among multiple modes, thereby improving operability in the customization task.

In general, in customization of the setting screen, the user selects an item arranged on the setting screen from among multiple items, whereby the selected item is arranged on the setting screen that is the target of customization, and customization is carried out. Also, if the electronic apparatus has multiple modes and customization of the setting screen can be performed for each of the modes, it is necessary to perform customization of the setting screen for each mode.

With an electronic apparatus having multiple modes, there are cases where it is desired that items that are to be displayed according to the mode and items that are to always be displayed regardless of the mode are both included on the setting screen. However, with customization of a general setting screen, the setting screens to be displayed for each mode are treated separately for each mode. For this reason, even if there is a desire to perform customization such that a portion of the setting screen changes according to the mode, both mode-independent display items and mode-dependent display items need to be set in the setting screen for each mode, and the operation amount of the user in the customization operation increases.

SUMMARY OF THE INVENTION

An embodiment of the present invention provides an electronic apparatus according to which it is possible to perform customization with a simple operation in which a portion of the display items to be displayed are used in common on the respective setting screens for the multiple modes, and a method of controlling the same.

According to one aspect of the present invention, there is provided an electronic apparatus, comprising: a setting unit configured to set a display item to be displayed on a setting screen; a mode setting unit configured to set a mode from among a plurality of modes; and a display control unit configured to display the setting screen in accordance with the mode set by the mode setting unit and the display item set by the setting unit, wherein the setting screen has a first area for displaying display items that differ for each mode, and a second area for displaying display items that are displayed in a plurality of modes.

According to another aspect of the present invention, there is provided an image capturing apparatus comprising: a setting unit configured to set a display item to be displayed on a setting screen; a mode setting unit configured to set an imaging mode from among a plurality of imaging modes; and a display control unit configured to display the setting screen in accordance with the imaging mode set by the mode setting unit and the display item set by the setting unit, wherein the setting screen has a first area for displaying display items that differ for each imaging mode, and a second area for displaying display items that are displayed in a plurality of imaging modes.

According to another aspect of the present invention, there is provided a control method for an electronic apparatus, comprising: setting a display item to be displayed on a setting screen; setting a mode from among a plurality of modes; and displaying the setting screen in accordance with the mode set in the mode setting and the display item set in the setting, wherein the setting screen has a first area for displaying display items that differ for each mode, and a second area for displaying display items that are displayed in a plurality of modes.

According to another aspect of the present invention, there is provided a computer readable medium storing a program for causing a computer to execute a method of controlling an electronic apparatus, the control method comprising: setting a display item to be displayed on a setting screen; setting a mode from among a plurality of modes; and displaying the setting screen in accordance with the mode set in the mode setting and the display item set in the setting, wherein the setting screen has a first area for displaying display items that differ for each mode, and a second area for displaying display items that are displayed in a plurality of modes.

Further features of the present invention will become apparent from the following description of exemplary embodiments (with reference to the attached drawings).

BRIEF DESCRIPTION OF THE DRAWINGS

FIG. 1C is a block diagram showing an example of a control configuration of the digital camera.

DESCRIPTION OF THE EMBODIMENTS

Hereinafter, several preferred embodiments of the present invention will be described with reference to the accompanying drawings.

First Embodiment

In the embodiments below, a digital camera is given as an example and described in detail as an electronic apparatus according to which a user can customize a display item to be displayed on a mode-dependent setting screen. The digital camera has a display device on its rear surface or the like and displays objects representing imaging functions and imaging states on a screen of the display device. The digital camera has multiple imaging modes, and since the imaging style differs according to the imaging mode, the imaging functions and imaging states to be displayed differ for each imaging mode. In particular, in a mode for the purpose of easily performing imaging (hereinafter referred to as "easy mode"), the level of the target photographer differs significantly compared to that in a normal imaging mode. For this reason, it is conceivable that imaging functions differ significantly in the easy mode and other modes and objects to be displayed in the easy mode also differ. It is also conceivable that in a case in which there are different photographers, such as a case in which the digital camera is shared by a family, the objects (setting items for imaging functions and display content for imaging state) to be displayed differ according to the photographer.

Figure 1A:
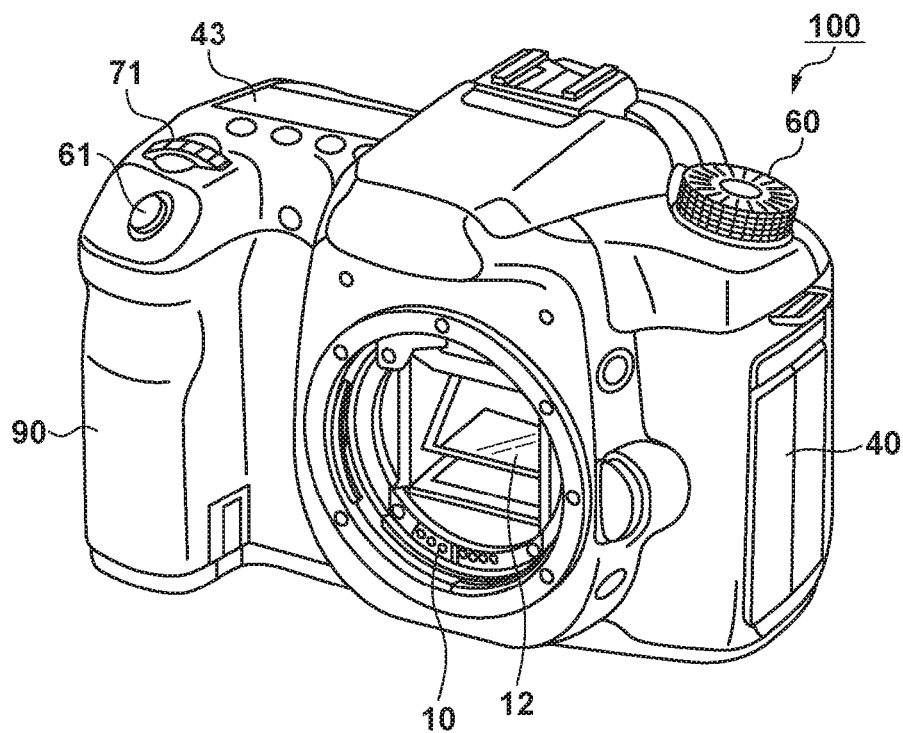
FIGS. 1A and 1B are diagrams showing an exterior of a digital camera according to an embodiment.
Figure 1B:
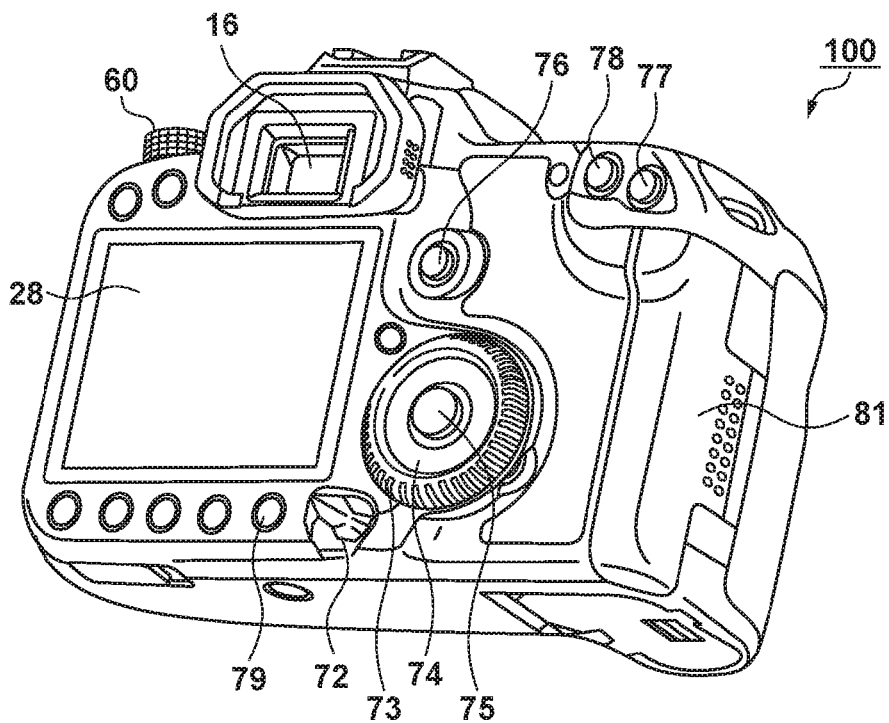

FIGS. 1A and 1B show external views of a digital camera 100 serving as an example of an electronic apparatus of the present embodiment. FIG. 1A is a front perspective view of the digital camera 100 and FIG. 1B is a rear perspective view of the digital camera 100. In FIGS. 1A and 1B, a display unit 28 is a display unit that displays images and various types of information and is provided on the camera rear surface. A finder external liquid crystal display unit 43 is a display unit provided on the camera upper surface and displays various setting values for the camera, including the shutter speed and aperture.

A shutter button 61 is an operation portion for performing an imaging instruction. A mode selection switch 60 is an operation portion for switching between various modes. A terminal cover 40 is a cover that protects a connector (not shown) such as a connection cable that connects an external apparatus and the digital camera 100. A main electronic dial 71 is a rotation operation member included in the operation unit 70 (FIG. 1C), and changing of setting values such as the shutter speed and aperture or the like can be performed by turning the main electronic dial 71. A power supply switch 72 is an operation member that switches on and off the power supply of the digital camera 100. A sub-electronic dial 73 is a rotation operation member included in the operation unit 70 (FIG. 1C), and can perform movement of a selection frame, image scrolling, and the like.

A cross key 74 is a key (four-direction key) whose upper, lower, left, and right portions can be pressed. It is possible to perform an operation corresponding to the pressed portion of the cross key 74. A set button 75 is a press button included in the operation unit 70 and is used mainly for determining selection items, and the like. An LV button 76 is a button for switching on and off live view (hereinafter referred to as "LV"). Also, in a video imaging mode, the LV button 76 is used to instruct the start and end of video imaging (recording). A zoom-in button 77 is an operation button for switching on and off a zoomed-in mode and changing magnification in the zoomed-in mode in live view display of an imaging mode. Also, the zoom-in button 77 functions as an operation button for zooming in on a reproduced image and increasing magnification in a reproduction mode. A zoom-out button 78 is a button for reducing the magnification of a zoomed-in reproduced image and zooming out of a displayed image. The reproduction button 79 is an operation button for switching between an imaging mode and a reproduction mode. By pressing the reproduction button 79 in the imaging mode, the reproduction mode is transitioned to, and the newest image among images recorded in a recording medium 200 (FIG. 1C) can be displayed on the display unit 28.

A quick return mirror 12 is moved up and down by an actuator (not shown) due to an instruction being given from a system control unit 50 (FIG. 1C). A communication terminal 10 is a communication terminal by which the digital camera 100 performs communication with a lens (which is detachable). An eyepiece finder (hereinafter, referred to as "finder 16") is a look-in type of finder for checking the focus and composition of an optical image of a subject obtained through a lens unit 150 (FIG. 1C) by observing a focusing screen 13 (FIG. 1C). A cover 81 is a cover for a slot in which the recording medium 200 is stored. A grip portion 90 is a holding portion with a shape that is easy to grip with the right hand when a user readies the digital camera 100.

FIG. 1C is a block diagram showing an example of a configuration of the digital camera 100 according to the present embodiment. In FIG. 1C, the lens unit 150 is a lens unit on which an exchangeable imaging lens is mounted. A lens 103 is normally constituted by multiple lenses, but here, only one lens is shown for simplicity. The communication terminal 6 is a communication terminal by which the lens unit 150 performs communication with the digital camera 100, and the communication terminal 10 is a communication terminal by which the digital camera 100 performs communication with the lens unit 150. The lens unit 150 performs focusing by communicating with the system control unit 50 via the communication terminals 6 and 10, performing control of a diaphragm 1 via a diaphragm driving circuit 2 by means of an internal lens system control circuit 4, and displacing the position of the lens 103 via an AF driving circuit 3.

An AE sensor 17 measures the brightness of a subject that has passed through the lens unit 150. A focus detection unit 11 outputs defocus amount information to the system control unit 50. The system control unit 50 controls the lens unit 150 based on the defocus amount information to perform phase difference AF. The quick return mirror 12 (hereinafter referred to as "mirror 12") is moved up and down by an actuator (not shown) due to an instruction being given from the system control unit 50 at a time of exposure, live view imaging, or video imaging. The mirror 12 is a mirror for switching a light flux that has entered from the lens 103 between the finder 16 side and the image capturing unit 22 side. The mirror 12 is normally arranged to cause reflection such that the light flux is guided to the finder 16, but in the case of performing imaging or in the case of live view display, the mirror 12 is raised upward and withdrawn from the light flux center such that the light flux is guided to the image capturing unit 22 (mirror up). Also, the mirror 12 is a half-mirror whose central portion can transmit a portion of the light, and a portion of the light flux is transmitted so as to be incident on the focus detection unit 11 for performing focus detection. By observing the focusing screen 13 via a pentaprism 14 and the finder 16, the photographer can check the focus and composition of the optical image of the subject obtained through the lens unit 150.

The shutter 101 is a focal plane shutter that can freely control the exposure time of the image capturing unit 22 according to the control of the system control unit 50. The image capturing unit 22 is an image sensor constituted by a CCD or CMOS sensor or the like that converts the optical image into an electrical signal. An A/D converter 23 converts an analog signal into a digital signal. The A/D converter 23 is used to convert the analog signal output from the image capturing unit 22 into a digital signal.

An image processing unit 24 performs predetermined resizing processing, such as pixel interpolation and compression, and color conversion processing on the data from the A/D converter 23 or on the data from the memory control unit 15. Also, with the pixel processing unit 24, predetermined calculation processing is performed using the captured image data, and the system control unit 50 performs exposure control and distance measurement control based on the obtained calculation result. Accordingly, TTL (through-the-lens) AF (auto-focus) processing, AE (automatic exposure) processing, and EF (flash pre-emission) processing are performed. The pixel processing unit 24 furthermore performs predetermined calculation processing using the captured image data and performs TTL AWB (auto-white balance) processing based on the obtained calculation result.

The output data from the A/D converter 23 is directly written in the memory 32 via the image processing unit 24 and the memory control unit 15, or via the memory control unit 15. The memory 32 stores image data that was obtained by the image capturing unit 22 and converted into digital data by the A/D converter 23, and image data for displaying on the display unit 28. The memory 32 has a storage capacity that is sufficient for storing a predetermined number of still images, and moving images and audio of a predetermined amount of time. The memory 32 also functions as a memory for image display (video memory).

A D/A converter 19 converts the data for image display stored in the memory 32 into an analog signal and supplies it to the display unit 28. Thus, the image data for display written in the memory 32 is displayed by the display unit 28 via the D/A converter 19. The display unit 28 performs display according to the analog signal from the D/A converter 19 on a display device such as an LCD. The digital signal that was subjected to A/D conversion by the A/D converter 23 and accumulated in the memory 32 is subjected to analog conversion by the D/A converter 19, sequentially transferred to the display unit 28, and is displayed, whereby the display unit 28 functions as an electronic view finder, and through-the-lens image display (live view display) can be performed.

A finder internal liquid crystal display unit 41 displays a frame (AF frame) showing a distance measurement point at which auto-focus is currently being performed, an icon indicating a camera setting state, and the like via a finder internal display unit driving circuit 42. The finder external liquid crystal display unit 43 displays various setting values for the camera, including the shutter speed and aperture, via a finder external display unit driving circuit 44.

The non-volatile memory 56 is a memory capable of electronically erasing and recording, and for example, an EEPROM or the like is used thereas. Constants, programs, and the like for operation of the system control unit 50 are stored in the non-volatile memory 56. A program in this context refers to a program for executing various types of flowcharts to be described later in the present embodiment.

The system control unit 50 performs overall control of the digital camera 100. By executing the program recorded in the above-described non-volatile memory 56, the later-described processes of the present embodiment are realized. Reference numeral 52 indicates a system memory, for which a RAM is used. The system memory 52 stores constants and variables for operation of the system control unit 50 and stores programs and the like read out from the non-volatile memory 56 that are loaded thereto. Also, the system control unit 50 performs display control by controlling the memory 32, the D/A converter 19, the display unit 28, and the like. A system timer 53 is a time measurement unit that measures amounts of time used for various types of control and the time of a built-in clock.

The mode selection switch 60, the first shutter switch 62 and second shutter switch 64 of the shutter button 61, and the operation unit 70 are operation units for inputting various types of operation instructions to the system control unit 50. The mode selection switch 60 switches the operation mode of the system control unit 50 to one of a still image recording mode, a video imaging mode, a reproduction mode, and the like. Examples of modes included in the still image recording mode include an auto-imaging mode, an auto-scene identification mode, a manual mode, an aperture priority mode (Av mode), and a shutter speed priority mode (Tv mode). Also, various types of scene modes, which are imaging scene-dependent imaging settings, a program AE mode, a custom mode, and the like are included. One of these modes included in the menu button is directly switched to with the mode selection switch 60. Alternatively, it is possible to use another operation member to switch to one of these modes included in the menu button after temporarily switching to the menu button using the mode selection switch 60. Similarly, multiple modes may be included in the video imaging mode.

The first shutter switch 62 is turned on with a so-called half-press (imaging preparation instruction) during an operation of the shutter button 61 provided in the digital camera 100, and generates a first shutter switch signal SW1. With the first shutter switch signal SW1, operations such as AF (auto-focus) processing, AE (automatic exposure) processing, AWB (auto-white balance) processing, and EF (flash pre-emission) processing are started. The second shutter switch 64 turns on with a so-called full-press (imaging instruction) upon completion of an operation of the shutter button 61 and generates the second shutter switch signal SW2. Due to the second shutter switch signal SW2, the system control unit 50 starts operation for a series of imaging processes starting from signal readout from the image capturing unit 22 to writing image data in the recording medium 200.

The operation members of the operation unit 70 have suitable functions assigned for each situation by performing a selection operation on various function icons displayed on the display unit 28, and are used as various types of functional buttons. Examples of function buttons include an end button, a return button, an image scrolling button, a jump button, a narrow-down button, an attribute change button, and the like. For example, if a menu button is pressed, the display unit 28 displays a menu screen according to which various settings can be performed. The user can perform various types of settings intuitively using the menu screen displayed on the display unit 28, a button with four directions, namely up, down, left, and right (cross key 74), and the set button 75.

The operation unit 70 includes various types of operation members that serve as input units for receiving operations from the user. The operation unit 70 includes at least the following operation units. That is, it includes the main electronic dial 71, the sub-electronic dial 73, the cross key 74, the set button 75, the LV button 76, the zoom-in button 77, the zoom-out button 78, and the reproduction button 79.

The power source control unit 80 is constituted by a battery detection circuit, a DC-DC converter, a switch circuit for switching between blocks to be charged, and the like, and performs detection of whether or not a battery is installed, the type of the battery, and the battery remaining amount. Also, the power source control unit 80 controls the DC-DC converter based on the detection result and an instruction from the system control unit 50 and supplies a needed voltage to the units including the recording medium 200 for a needed period.

The power source unit 30 is composed of a primary battery such as an alkali battery or a lithium battery, a secondary battery such as a NiCd battery, a NiMH battery, or a Li battery, an AC adapter, and the like. The recording medium I/F 18 is an interface with the recording medium 200, which is a memory card, a hard disk, or the like. The recording medium 200 is a recording medium such as a memory card for recording an imaged image, and is constituted by a semiconductor memory, a magnetic disk, or the like.

The communication unit 54 is connected wirelessly or by a wired cable, and performs transmission and reception of video image signals and audio signals. The communication unit 54 can connect to a wireless LAN (Local Area Network) and the Internet as well. The communication unit 54 can transmit an image captured by the image capturing unit 22 (includes a through-the-lens image) and an image recorded in the recording medium 200, and can receive image data and other various types of information from an external apparatus.

An orientation detection unit 55 detects the orientation of the digital camera 100 with respect to the direction of gravity. Based on the orientation detected by the orientation detection unit 55, it is possible to make a distinction as to whether the image imaged by the image capturing unit 22 is an image imaged with the digital camera 100 held horizontally or is an image imaged with the digital camera 100 held vertically. The system control unit 50 can attach orientation information corresponding to the orientation detected by the orientation detection unit 55 to the image file of the image imaged by the image capturing unit 22, and can rotate and record the image. An acceleration sensor, a gyrosensor, or the like can be used as the orientation detection unit 55.

Next, setting screen customization processing using the customization screen for performing the customization of the present embodiment by means of the digital camera 100 having the foregoing configuration, will be described with reference to FIGS. 2A to 2F. The screen shown in FIGS. 2A and 2C to 2F is the customization screen 201 displayed on the display unit 28 by the system control unit 50, which functions as a display control unit. Also, the screen shown in FIG. 2B is the selection screen 211 for allowing a user to select a display item by a customization operation. The user can customize the setting screen for performing various settings and display in the digital camera 100 by using the customization screen 201 and the selection screen 211. Note that when displaying the selection screen 211, display may be switched from the display of the customization screen 201 to the selection screen 211, or the selection screen 211 may be displayed in an overlapping manner on the customization screen.

The customization screen 201 is a screen displayed on the display unit 28 by the system control unit 50 in order to receive a customization operation from the user. The system control unit 50 arranges the setting area 202 in the customization screen 201 in the form of a 6×4 grid. Display items corresponding to objects for selecting/setting imaging functions and displaying an imaging state and the like are arranged in the setting area 202. The focus frame 203 indicates which setting area is to be the arrangement location of the display item among the multiple setting areas 202 of the customization screen 201. The user can move the focus frame 203 to any setting area by an operation of the cross key 74, for example. When the user moves the focus frame 203 to a setting area 202 and selects a display item that corresponds to the object to be displayed, the desired display item is arranged in the setting area 202 on which the focus frame 203 is arranged. Thus, the setting screen can be customized such that an object is displayed at a desired position.

The system control unit 50 sets a mode-dependent area 204 and a mode-independent area 205 on the customization screen 201. In the example shown in FIG. 2A, the mode-dependent area 204 and the mode-independent area 205 are each the size of 6×2 setting areas 202. Note that the ranges (sizes) of the mode-dependent area 204 and the mode-independent area may be set freely by the user (be variable), or may be predetermined and fixed. Hereinafter, in the description of the present embodiment, the mode-dependent area 204 is expressed with diagonal lines. Also, the mode-independent area 205 is an area in which the setting areas 202 not belonging to the mode-dependent area 204 are arranged.

When the system control unit 50 detects a press of the set button 75, for example, the setting area 202 at which the focus frame 203 is located is considered to have been selected, and display of the display unit 28 is transitioned to the selection screen 211 for selecting the display item in FIG. 2B. Also, at this time, the digital camera 100 is such that the Av mode (aperture priority mode), which is one of multiple modes that can be set, is selected using an operation of the mode selection switch 60 by the user. Note that in the following description, the imaging mode and the like of the digital camera 100 will be collectively written as "mode".

Figure 2A:
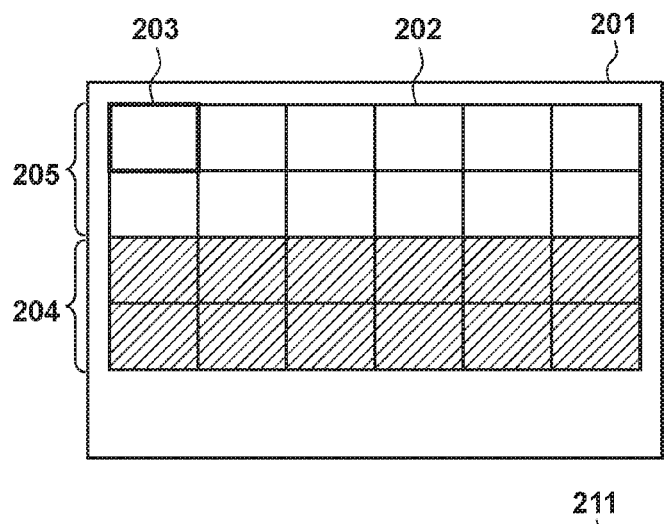
FIGS. 2A to 2F are diagrams showing examples of customization screens at times of customizing setting screens.
Figure 2B:
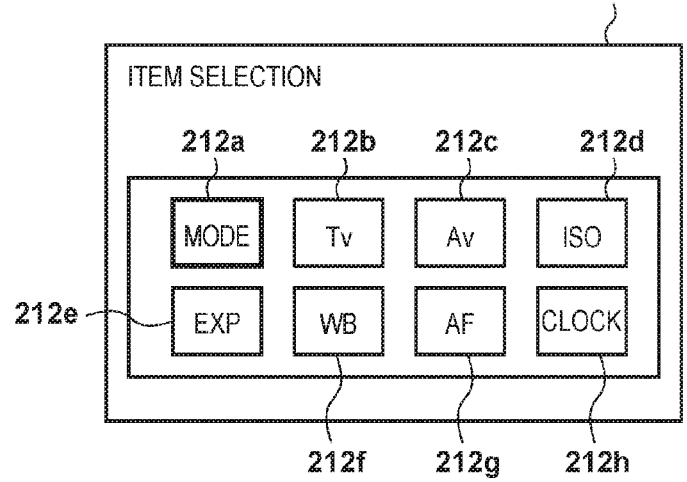
Figure 2C:
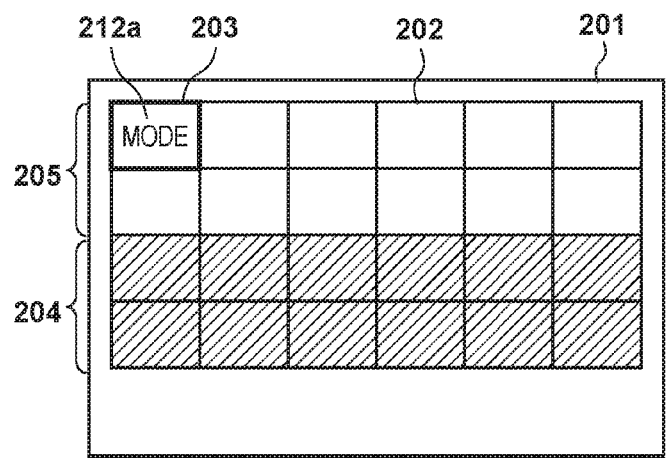

Upon detecting a press of the set button 75 in the state shown in FIG. 2A, the system control unit 50 stores the setting area at which the focus frame 203 is located as the selected setting area in the system memory 52 and causes the display of the display unit 28 to transition to the selection screen 211 shown in FIG. 2B. On the selection screen 211, multiple selectable display items are displayed as a list. In FIG. 2B, display items 212a to 212h are displayed. If the selectable display items do not fit on one screen, a known technique such as scrolling or page switching is used, for example. The correspondence between the display items illustrated in FIG. 2B and the objects is as follows. The display item 212a indicates an object for checking the currently-set mode and setting a mode. The display item 212b indicates an object for checking the current shutter speed and setting the shutter speed. The display item 212c represents an object for checking the current aperture value and setting an aperture value. The display item 212d indicates an object for checking the currently-set ISO sensitivity and setting an ISO sensitivity. The display item 212e indicates an object for checking a current state of exposure correction and setting exposure correction. The display item 212f indicates an object for checking the current white balance and setting a white balance. The display item 212g indicates an object for checking the currently-set AF operation and setting an AF operation. The display item 212h indicates an object for displaying the current time and setting a clock.

On the selection screen 211 for the display items in FIG. 2B, the frame line of the display item selected by the user is displayed as a thick line, and on the selection screen 211 in FIG. 2B, it is indicated that the display item 212a has been selected. The user selects a desired one of the display items 212a to 212h on the selection screen 211 using an operation of the cross key 74 and the set button 75, for example. For example, if the set button 75 is pressed in the state shown in FIG. 2B, the display item 212a is selected. Upon detecting that a display item has been selected on the selection screen 211, the system control unit 50 causes the display of the display unit 28 to transition to the customization screen 201 shown in FIG. 2C. The system control unit 50 arranges the display item 212a selected on the selection screen 211 shown in FIG. 2B in the setting area designated using the focus frame 203 and displays the customization screen 201 shown in FIG. 2C.

Figure 2D:
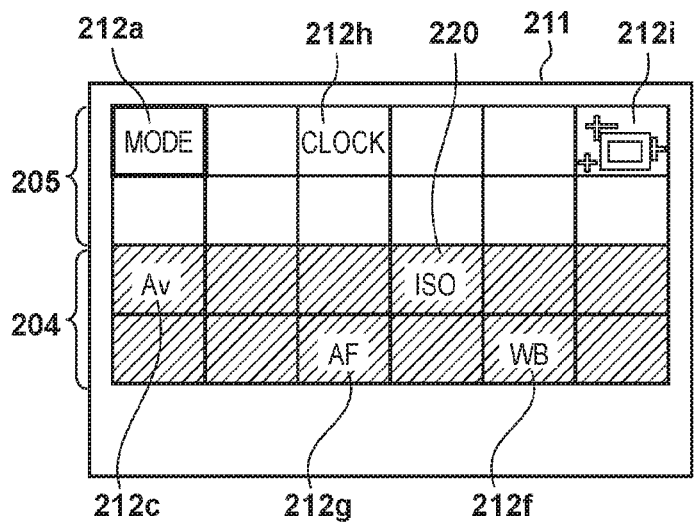
Figure 2E:
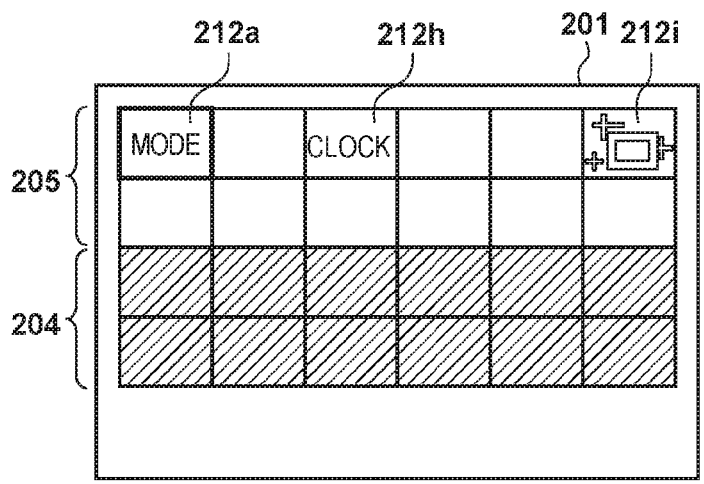

By repeating the foregoing operation, it is possible to create the customization screen 201 in which display items selected from the selection screen 211 are arranged in multiple setting areas 202, as shown in FIG. 2D. On the customization screen 201 shown in FIG. 2D, the display items 212a, h, and i are arranged in setting areas in the mode-independent area 205, and the display items 212c, d, f, and g are arranged in setting areas in the mode-dependent area 204. Note that the display item 212i corresponds to an object for setting sensor cleaning.

Next, in the display state shown in FIG. 2D, it is assumed that the user has changed the mode of the digital camera 100 to AUTO (automatic mode) for example using the mode selection switch 60. Upon detecting a mode change operation performed by the user, the system control unit 50 switches the items set in the mode-dependent area 204 to items corresponding to the post-change mode (here, AUTO mode) and displays them. If no items have been set for the AUTO mode at this time, no display items are displayed in any setting area in the mode-dependent area 204, as shown in the customization screen 201 in FIG. 2D. On the other hand, in the mode-independent area 205, the content set for the mode-independent area 205 is displayed by the system control unit 50.

Figure 2F:
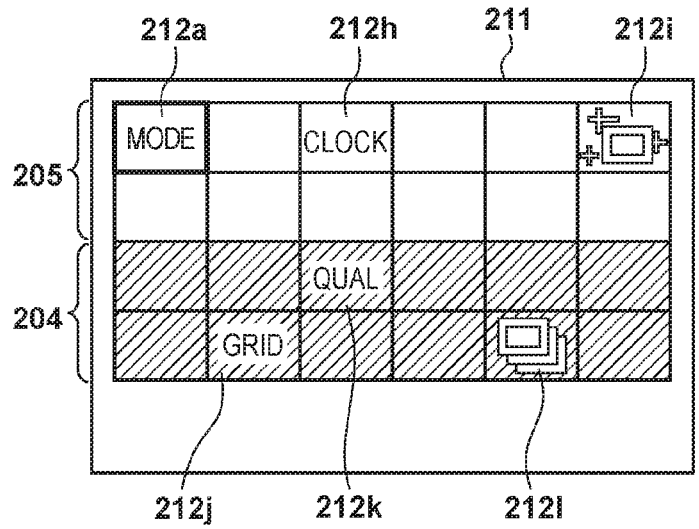

The customization screen 201 in FIG. 2F indicates a state in which the user repeatedly performs setting processing while in the AUTO mode and the display items 212j, k, and 1 are arranged in the mode-dependent area 204. Note that the display item 212j corresponds to an object for displaying grid lines during imaging. The display item 212k corresponds to an object for setting recording quality of an image. The display item 212l corresponds to an object for setting a drive mode.

Next, display processing for a setting screen customized with an operation using the customization screen described above will be described with reference to FIGS. 3A and 3B. The layout positions of the display items on the customization screen 201 described above with reference to FIGS. 2A and 2C to 2F correspond to the layout positions of the display items on the setting screen 301. Note that in the following description, the setting shown in FIG. 2D is performed for the Av mode, and the setting shown in FIG. 2F is performed for the AUTO mode in the digital camera 100. Also, as the items to be displayed in multiple modes, it is assumed that the settings shown in the mode-independent area 205 in FIGS. 2D to 2F have been made.

Figure 3A:
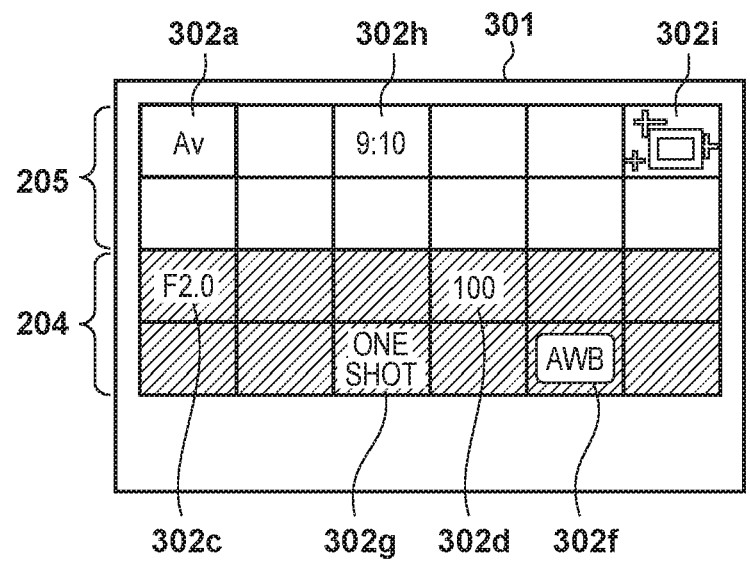
FIGS. 3A and 3B are diagrams showing examples of customized setting screens.
Figure 3B:
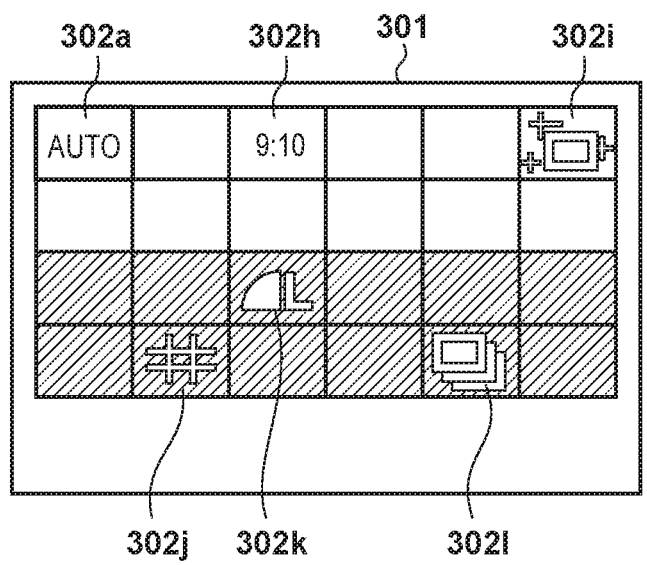

Upon detecting that the mode selection switch 60 was operated by the user in an imaging standby state and the Av mode was entered, the system control unit 50 displays the setting screen 301 shown in FIG. 3A. That is, in the mode-independent area 205 in FIG. 3A, the system control unit 50 displays objects designated using the display items 212a, 212h, and 212i set in the mode-independent area 205 in FIG. 2D during a customization operation. At this time, the objects displayed in FIG. 3A indicate setting values set in the digital camera 100 at that time for the content specified by the display contents. For example, the display item 212a in FIG. 2D corresponds to an object 302a for setting the mode of the digital camera, and the object 302a in FIG. 3A displays "Av", which indicates the current mode (Av mode) of the digital camera 100. Similarly, the system control unit 50 displays an object 302h (indicating current time) for the time, corresponding to the display item 212h, and an object 302i for sensor cleaning, corresponding to the display item 212i.

The system control unit 50 displays the display items selected in correspondence with the current mode in the mode-dependent area 204 shown in FIG. 3A. Because the digital camera 100 is currently set to the Av mode, objects corresponding to the display items set in the mode-dependent area 204 in FIG. 2D are displayed in the mode-dependent area 204 in FIG. 3A. The contents displayed by the objects are the setting values currently set for the display items in the digital camera 100, similarly to the items of the mode-independent area 205. For example, in FIG. 2D, the display item 212c is a display item for setting the aperture value, and the object 302c indicating the aperture value set in the digital camera 100 is displayed in the corresponding setting area in FIG. 3A. Also, an object 302g (indicates that "one shot" is currently set) is displayed in correspondence with the display item 212g indicating the auto-focus setting. An object 302d (indicates that "ISO=100" is currently set) is displayed in correspondence with the display item 212d indicating the ISO setting. An object 302f (indicates that "auto-white balance" is currently set) is displayed in correspondence with the display item 212f indicating the white balance setting. When objects such as those described above are selected in the setting screen, it is possible to perform setting of the corresponding items. For example, an ISO value can be set by selecting the object 302d.

Next, a case will be described in which the mode is changed by the user using the mode selection switch 60 in the display state shown in FIG. 3A. In this example, a case of switching from the Av mode to the AUTO mode using the mode selection switch 60 will be described. Upon detecting that the mode was switched to AUTO mode, the system control unit 50 displays the setting screen 301 in FIG. 3B. On the setting screen 301, there is no change from the state shown in FIG. 3A for the setting items displayed in the mode-independent area 205. Note that the object 302a displays "AUTO", which indicates the AUTO mode. Also, in the mode-dependent area 204, the system control unit 50 displays the objects 302j, k, and 1, which correspond to the display items 212j, k, and 1 (FIG. 2F) selected in correspondence with the AUTO mode.

Figure 4:
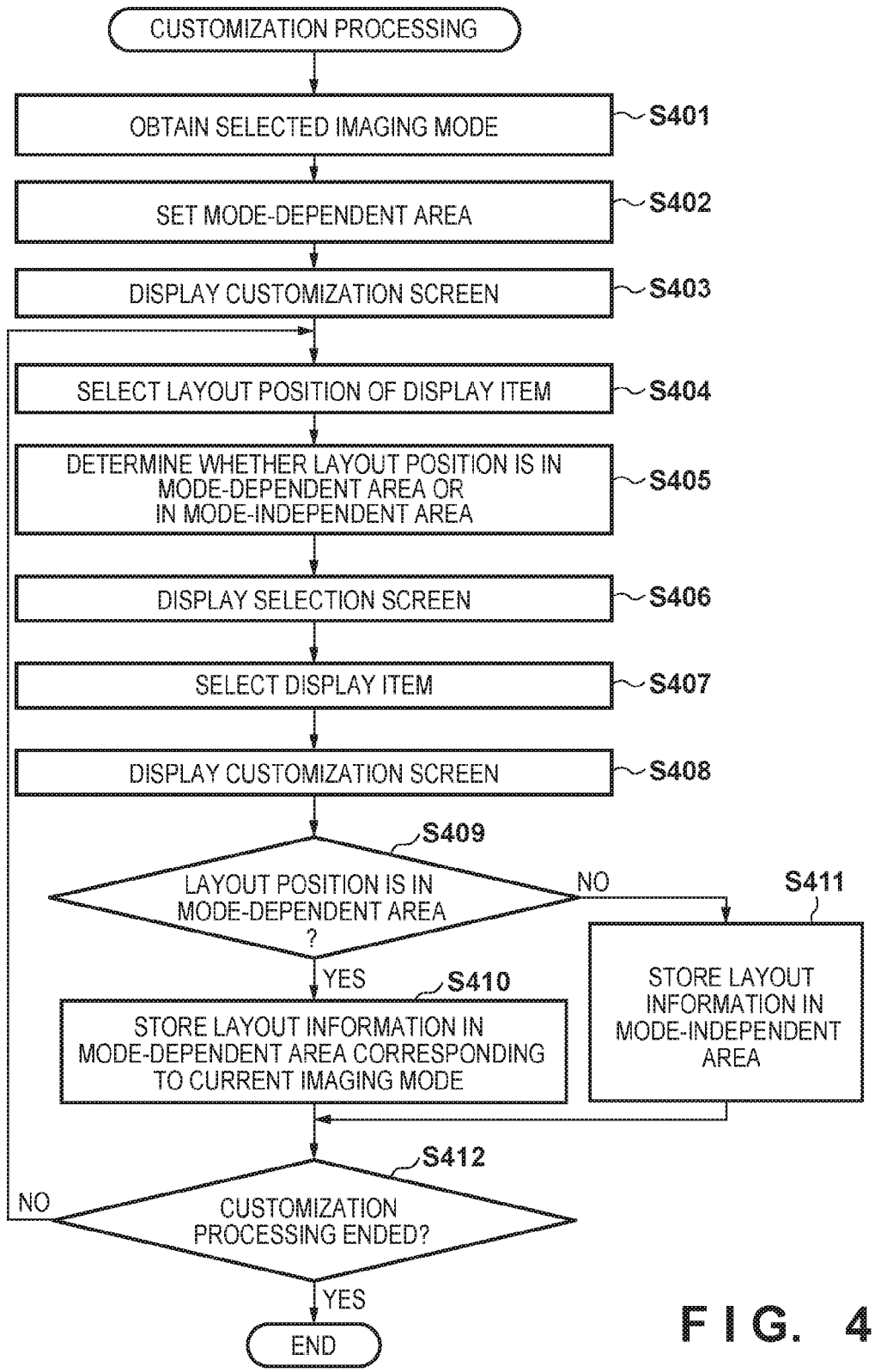
FIG. 4 is a flowchart showing customization processing in an embodiment.
Figure 5:
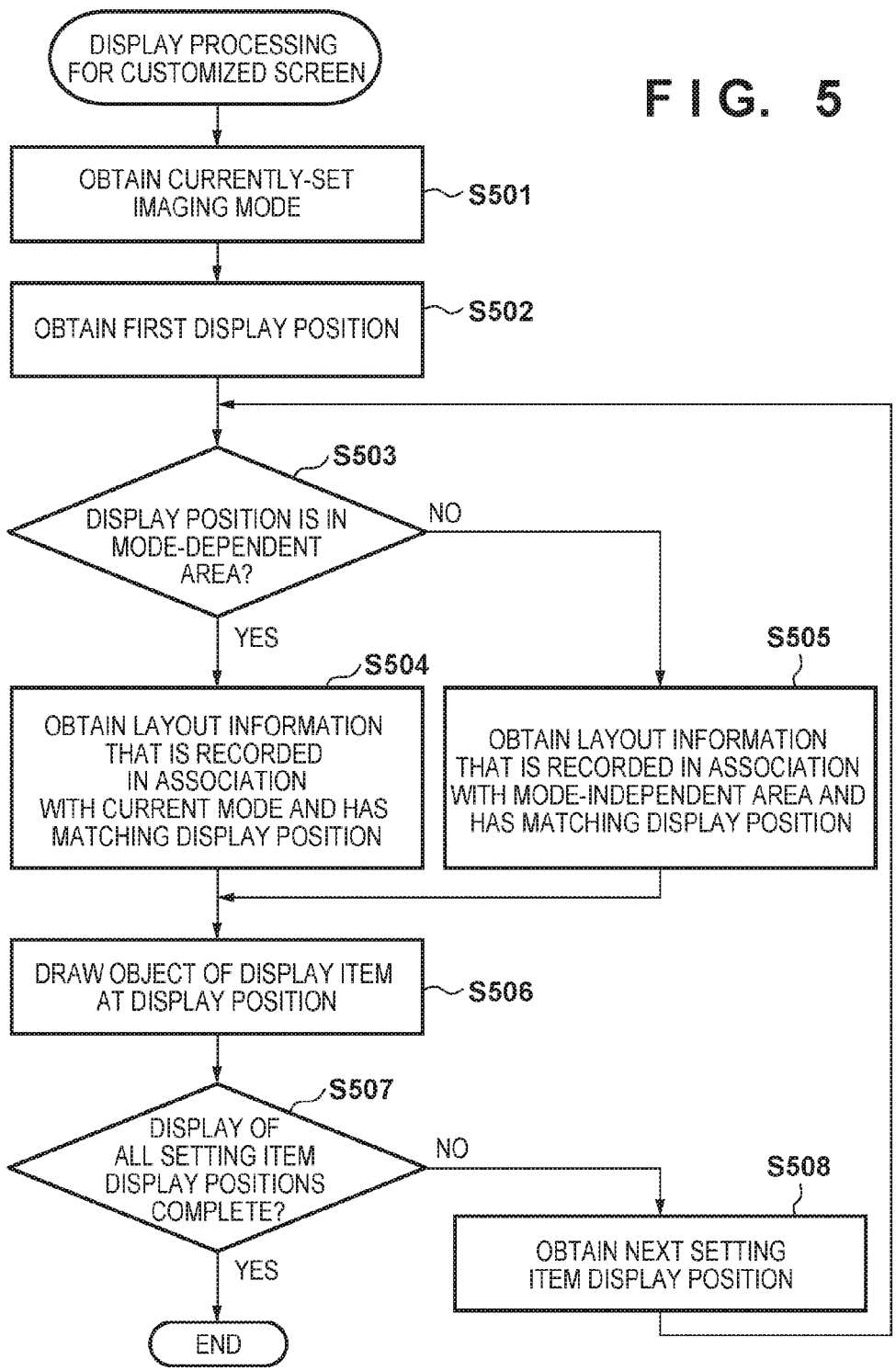
FIG. 5 is a flowchart showing display processing for a setting screen in an embodiment.

Next, setting control processing for the customization screen and display control processing for the customization screen performed by the system control unit 50 will be described with reference to the flowcharts in FIGS. 4 and 5. Note that the program for performing the processing shown in FIGS. 4 and 5 is stored in the non-volatile memory 56, and a processor (not shown) of the system control unit 50 reads out the program from the non-volatile memory 56 as appropriate and executes it. Note that the system memory 52 (RAM) is used as a work memory at a time of executing the program.

First, customization processing of the setting screen performed by the system control unit 50 will be described with reference to FIG. 4. When a customization operation is selected from a predetermined operation menu, the processing of FIG. 4 is started. In step S401, the system control unit 50 obtains the current imaging mode stored in the system memory 52. Note that the current imaging mode is the mode selected using the mode selection switch 60, for example. In step S402, the system control unit 50 sets the mode-dependent area 204 and the mode-independent area 205 in the area for arranging the display items. The manner in which to set the mode-dependent area 204 and the mode-independent area 205 may be stored in advance in the non-volatile memory 56 or the like, or it is possible to allow the user to set it as the user sees fit. In step S403, the system control unit 50 displays the customization screen 201 shown in FIG. 2A on the display unit 28.

When the customization screen 201 is displayed, in response to a user operation, processing for recording the display items designated as targets to be displayed in multiple modes by the user in the memory as common display items (steps S404 to S409, S411), and processing for recording the display items designated as mode-dependent display targets by the user in the memory in association with the modes selected as targets of customization among the multiple modes (steps S404 to S410) are executed. Hereinafter, recording processing executed in steps S404 to S411 will be described in detail.

In step S404, the system control unit 50 receives a selection of a layout position of a display item by a user operation. More specifically, the system control unit 50 receives a user operation on the cross key 74 and moves the focus frame 203. Then, upon receiving a user operation on the set button 75, the system control unit 50 detects the position of the focus frame 203 at that time as the layout position of the display item and stores it in the system memory 52. Thus, in step S404, the system control unit 50 receives a user designation of a layout position at which a display item designated by the user is to be arranged on the customization screen for editing the display items to be displayed on the setting screen, and the processing moves to step S405.

In step S405, the system control unit 50 determines whether the layout position stored in the system memory 52 in step S404 belongs to the mode-dependent area 204 or belongs to the mode-independent area 205 and stores the result in the system memory 52. In step S406, the system control unit 50 displays, on the display unit 28, a selection screen (e.g., selection screen 211 shown in FIG. 2B) for allowing the user to select one of multiple display items as a display item to be arranged at the layout position designated by the user. Thus, the system control unit 50 displays the selection screen 211 in response to the user selecting a layout position in the customization screen (step S405). On the selection screen 211, multiple display items that can be selected by the user are displayed as a list.

At this time, the system control unit 50 changes the order and content of the display items being displayed as a list, in accordance with whether the layout position selected by the user on the customization screen is in the mode-independent area 205 or in the mode-dependent area 204. Furthermore, if the layout position selected by the user is in the mode-dependent area 204, the system control unit 50 changes the order and content of the display items displayed as a list in accordance with the selected mode. Thus, by changing the order and content of the display items to be displayed between a case in which the determination result stored in step S405 is the mode-independent area 205 and a case in which the determination result stored in step S405 is the mode-dependent area 204, it is possible to provide an interface that is easier for the user to use. For example, there is a high likelihood that items enabled for all modes are arranged in the mode-independent area, and conversely, there is a high likelihood that items unique to a mode are arranged in the mode-dependent area. For this reason, if the determination result of step S405 is the mode-independent area, the system control unit 50 displays items enabled for all modes with priority in the selection screen 211. Also, if the determination result of step S405 is the mode-dependent area, the system control unit 50 displays items unique to a mode with priority on the selection screen 211. Accordingly, the user can more easily search for items to be set. Note that it is possible to keep a record of selection of display items for the mode-independent area 205 and the mode-dependent area 204 and determine the priority levels of display items on the selection screen 211 according to which items are likely to be selected in each area.

Figure 6A:
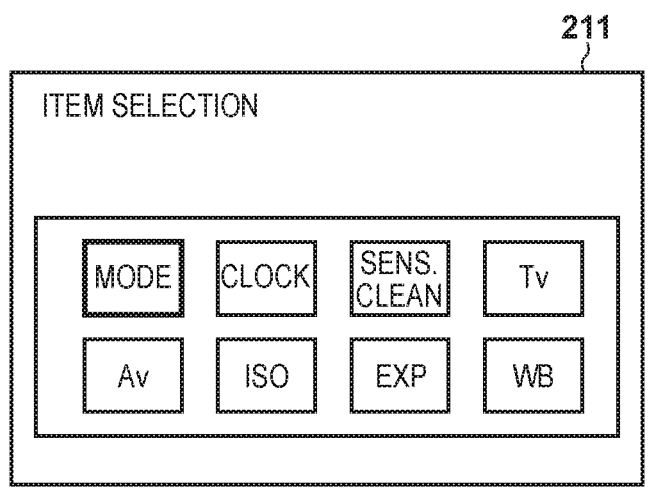
FIGS. 6A and 6B are diagrams showing selection screens for selecting display items.
Figure 6B:
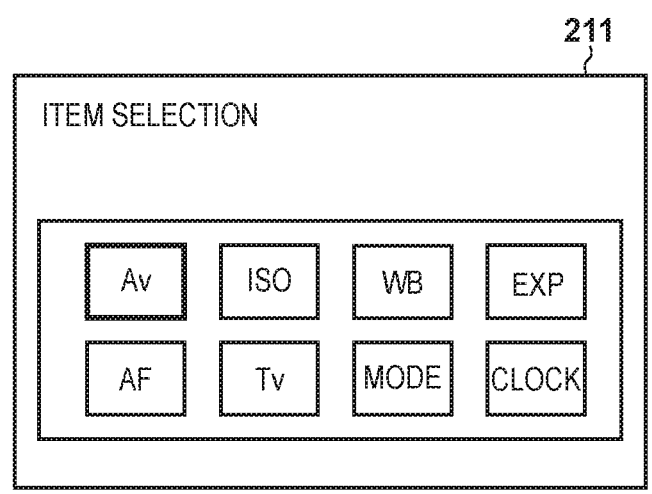

FIG. 6A shows an example of display of the selection screen 211 for display items in the case where the layout position selected in step S404 is in the mode-independent area 205. Mode setting, time setting, sensor cleaning, and the like, which are items that are enabled regardless of the mode, are displayed at the front of the options, and items for setting imaging parameters that are disabled depending on the mode are displayed thereafter. On the other hand, FIG. 6B shows an example of the selection screen 211 in the case where the layout position selected in step S404 is in the mode-dependent area 204. Unlike FIG. 6A, items that are enabled in the mode set at the time of selecting the display items are displayed at the front of the options. In this way, by changing display of the options between the mode-dependent area and the mode-independent area, it is possible to allow the user to select an item more easily.

Next, in step S407, the system control unit 50 receives a user operation on operation units such as the cross key 74 and the set button 75 and determines which display item was selected by the user using the selection screen 211. Then, in step S408, the system control unit 50 switches the display of the display unit 28 to the customization screen (e.g., FIG. 2C) displaying the display items selected from the selection screen 211 according to the selection of the display items. More specifically, for example, the user can change the display items in the selected state by operating the cross key 74 and can select the display items in the selected state at this time by pressing the set button 75. At this time, the system control unit 50 displays the display items selected by the user in step S407 in the setting area 202 specified by the layout position stored in the system memory 52 in step S404.

In step S409, the system control unit 50 references the result of determining whether or not the layout position is in the mode-dependent area in step S405 (stored in the system memory 52) and the processing branches. If the layout position was in the mode-dependent area 204, the processing moves to step S410, and if not (i.e., if the layout position was in the mode-independent area 205), the processing moves to step S411. In step S410, the system control unit 50 stores the display item selected by the user in step S407 and the layout position of the display item in the non-volatile memory 56 in association with the mode obtained in step S401. Thus, if the layout position designated by the user on the customization screen is in a first area (mode-independent area 205) of the customization screen, the display item designated by the user is recorded as a target to be displayed in multiple modes. In step S411, the system control unit 50 stores the display item selected by the user in step S407 and the layout position of the display item in the non-volatile memory 56 as mode-independent information. Thus, if the layout position designated by the user in the customization screen is in a second area (mode-dependent area 204), which is different from the first area of the customization screen, the display item designated by the user is recorded as a mode-dependent display target.

Then, in step S412, the system control unit 50 determines whether or not an operation for indicating the end of setting by means of the customization screen has been given by the user, and if an instruction has been given, the present processing ends, and if no instruction has been given, the processing returns to step S404. Note that if the selection of the mode is switched using the mode selection switch 60, the processing returns to step S401, although this is not shown in the flowchart in FIG. 4. That is, if another mode is selected as the mode for the setting screen that is the customization target, the system control unit 50 changes the customization target to the setting screen for the other mode that was selected. By using this kind of configuration, it is possible to set the setting screen for any mode as a target during a customization operation, and thus operability is improved. Also, because the mode selection switch 60 is used as the configuration for allowing a user to select the mode to be the customization target out of multiple modes, it is possible to select the mode to be the customization target with an operation similar to that used during imaging standby, and thus the operation is easy for the user to understand.

Figure 7:
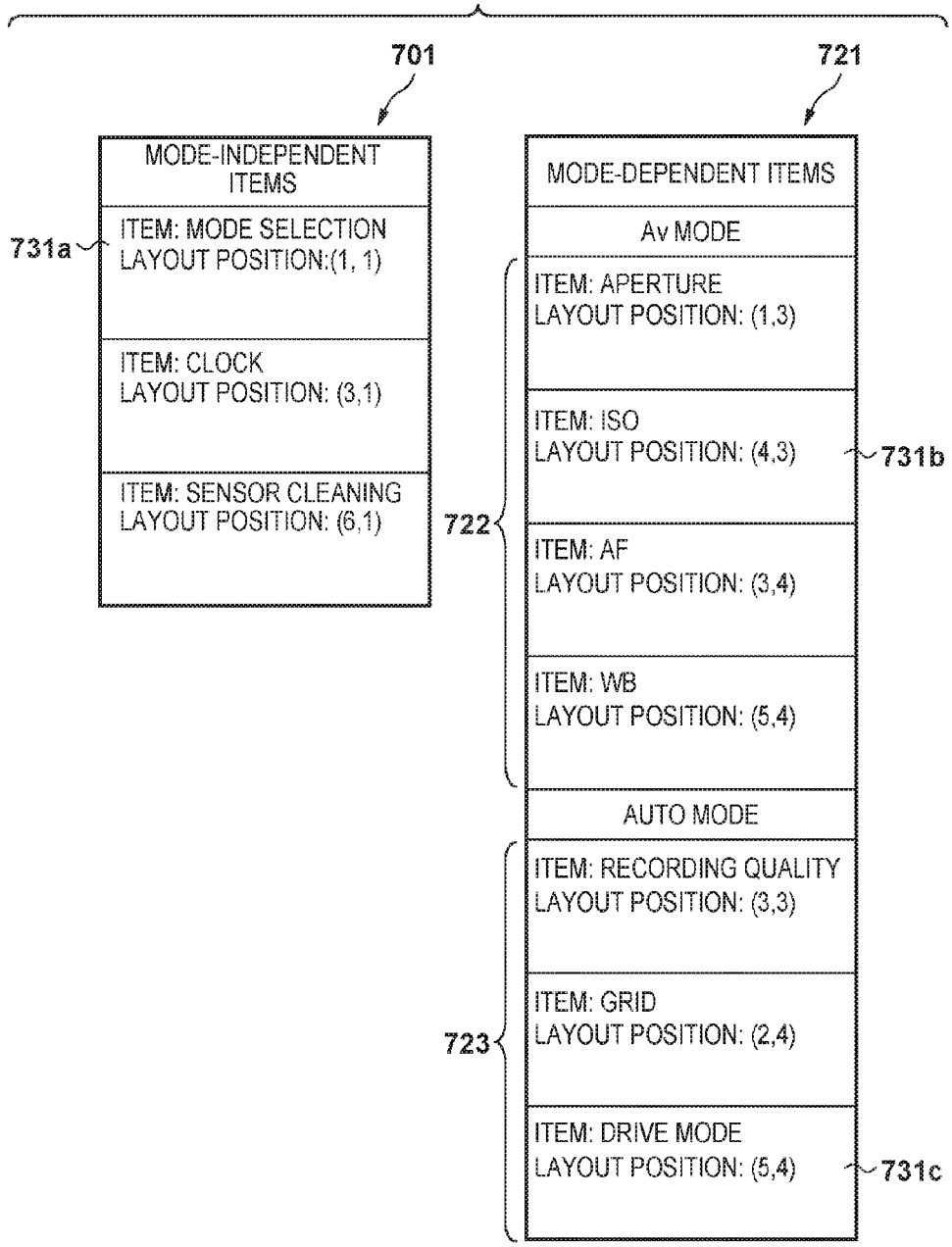
FIG. 7 is a diagram showing an example of recording layout information in a memory.

Note that in steps S410 and S411, the system control unit 50 stores the type and layout position of the display item in the non-volatile memory 56 and generates layout information. The user repeatedly selects setting areas and display items, whereby the system control unit 50 can set a setting screen such as that shown in FIG. 2D or 2F. FIG. 7 shows the layout information generated in steps S410 and S411 when a display item is arranged in the setting area for the customization screen as shown in FIGS. 2D and 2F. The layout positions of the display items selected to be arranged in the mode-independent area 205 are recorded in mode-independent layout information 701, which indicates layout information of mode-independent items. The mode-independent layout information 701 is generated by recording the layout information in step S411. Also, the layout positions of the display items selected to be arranged in the mode-dependent area 204 are recorded in mode-dependent layout information 721 in association with the modes. The mode-dependent layout information 721 is generated by recording the layout information in step S410. Note that the layout positions are indicated in units of 6×4 layout areas, in which the upper left area is indicated as (1,1) and the lower right area is indicated as (6,4). In this way, in step S411, the layout information indicating the designated display items and the layout positions of the display items is stored in the non-volatile memory 56 as the mode-independent layout information 701. Also, in step S410, the layout information indicating the designated display items and the layout positions of the display items is recorded in the non-volatile memory 56 for each mode.

For example, the layout information 731*a* indicates that the display item for "mode selection" is arranged in the layout area (1,1), and this indicates the layout state of the display item 212*a* in FIGS. 2D and 2F. Also, the layout information 731*b* shows display items arranged in the mode-dependent area 204 in the case where the Av mode has been set, and this indicates the layout state of the display item 212*d* in FIG. 2D. Similarly, the layout information 731*c* indicates the display items arranged in the mode-dependent area 204 in the case where the AUTO mode has been set, and this indicates the layout state of the display item 2121 in FIG. 2F.

Processing for when the system control unit 50 performs display control for displaying the setting screen customized using the customization screen (e.g., the setting screen 301 shown in FIGS. 3A and 3B) will be described next with reference to the flowchart in FIG. 5. This processing is executed when the digital camera 100 transitions to the imaging standby state, or when the mode is switched using the mode selection switch 60 in the imaging standby state. In the display control described hereinafter, on the display of the setting screen during imaging standby, objects corresponding to display items recorded as targets to be displayed in multiple modes and objects corresponding to display items recorded in association with the currently-set mode among the display items recorded as mode-dependent display targets are displayed on the setting screen as a list. Hereinafter, the details of such display control will be described.

In step S501, the system control unit 50 obtains the current mode stored in the system memory 52. As described above, the mode selected using the mode selection switch 60 is stored in the system memory 52, and the system control unit 50 can obtain the current mode from the system memory 52. In step S502, the system control unit 50 obtains the first display position. In this description, the upper left location (setting area in which the display item 212*a* of FIGS. 2D and 2F are displayed) in the setting screen 301 of FIG. 3A is obtained. Note that the positions of the setting areas in the setting screen 301 correspond to the positions of the setting areas 202 in the customization screen 201. Accordingly, the setting area with the coordinates (1,1) in the customization screen 201 is the area at the display position with the coordinates (1,1) in the setting screen 301.

In step S503, the system control unit 50 determines whether the position obtained in step S502 is in the mode-dependent area or the mode-independent area. If the obtained position belongs to the mode-dependent area 204, the processing moves to step S504, and if not (if the obtained position belongs to the mode-independent area 205), the processing moves to step S505. In step S504, the system control unit 50 obtains, from the non-volatile memory 56, layout information that is associated with the current mode obtained in step S501 and has a layout position matching the display position obtained in step S502. On the other hand, in step S505, the system control unit 50 obtains, from the non-volatile memory 56, layout information that has a layout position matching the display position obtained in step S502, among the pieces of layout information recorded in association with the mode-independent area.

In step S506, the system control unit 50 draws the object of the display item obtained in step S504 or S505 at the display position obtained in step S502. Note that if no item for the layout position corresponding to the display position was obtained in step S504 or step S505, nothing is drawn at the display position. In step S507, the system control unit 50 determines whether or not the processing for all of the display positions is complete. If the processing for all of the display positions is complete, the display processing for the customization screen ends. If not, the processing moves to step S508. Note that the determination of whether or not the processing for all of the display positions is complete is performed based on whether or not the display position subjected to display processing was the right end of the lowermost row, for example.

In step S508, the system control unit 50 obtains the next display position. The next display position is the display position on the right side from the display position currently undergoing display processing. Note that in the case where the position at which the setting item is displayed is the right end in step S506, the left end of the next row (the row below) is used as the next display position. Steps S503 to S507 are carried out again for the next display position obtained in step S508. By repeating the above-described processing for all of the display positions, it is possible to display a setting screen on which the contents of customization set using the flowchart in FIG. 4 are reflected. At this time, the objects for the display items selected according to the mode at that time can be displayed in the mode-dependent area 204 of the setting screen 301.

For example, layout information shown in FIG. 7 (the mode-independent layout information 701 and the mode-dependent layout information 721) is recorded in the non-volatile memory 56. When the display processing for the customization screen is started, the system control unit 50 first obtains the display position (1,1) (step S502). Due to the fact that the display position thereof belongs to the mode-independent area 205, the system control unit 50 searches for layout information with the layout position (1,1) in the mode-independent layout information 701 and obtains the layout information 731a for "mode selection" (S505). Then, the system control unit 50 draws the obtained object for "mode selection" at the display position (1,1). At this time, the objects are drawn so as to indicate the currently-set mode. For example, if the Av mode is set, an object 302a shown in FIG. 3A is drawn. Also, if the object 302a is selected by the user, the mode setting menu (e.g., a list of settable modes, such as auto mode, and shutter speed priority mode) is displayed, and the user can set the desired mode.

Also, when the display processing advances and (4,3) is obtained at the display position, the system control unit 50 searches for the mode-dependent layout information 721 due to the fact that the display position belongs to the mode-dependent area 204 (S504). Here, if the Av mode is set, the system control unit 50 searches for an item whose layout position matches (4,3) from among the layout information group 722 associated with the Av mode (step S504). In the example shown in FIG. 7, the display item "ISO" is obtained, and the system control unit 50 draws the object corresponding to "ISO" at the display position (4,3). At this time, the system control unit 50 obtains the currently-set ISO value and draws the object indicating that value. Also, when the ISO object is selected from the setting screen 301, the ISO setting menu (e.g., a list of settable ISO values) is displayed, and the user can set the desired ISO value.

Second Embodiment

The first embodiment described a configuration in which items to be displayed in the mode-dependent area 204 that displays items selected for each mode were selected and set one by one by the user. In this case, if there are multiple modes, the items need to be set in the mode-dependent area for each mode. For this reason, depending on the mode, if the mode-dependent area is to be given the same setting as another mode, the user needs to set all of the display items for each mode, which is inconvenient. In view of this, in the second embodiment, the foregoing problems are solved by making it so that the layout of display items in the mode-dependent area set for a certain mode can be copied to the mode-dependent area for another mode. That is, in response to an instruction to copy from a copy-source mode to a copy-destination mode on the setting screen, the layout information group recorded in association with the copy-source mode is copied and stored as the layout information group for the copy-destination mode. Hereinafter, customization processing using such a customization screen will be described with reference to the flowchart in FIG. 8. Note that the configuration of the digital camera 100, customization processing, and the like according to the second embodiment are similar to those of the first embodiment.

Note that in the second embodiment, an operation menu provided by the digital camera 100 is used to select whether to perform a first customization setting according to the procedure indicated in the above-described first embodiment, or to perform a second customization setting using copying, as will be described below. Then, if the first customization setting is selected, the customization setting is carried out using the procedure of the first embodiment (FIG. 4), and if the second customization setting is selected, the customization setting described below with reference to the flowchart of FIG. 8 is carried out.

Figure 8:
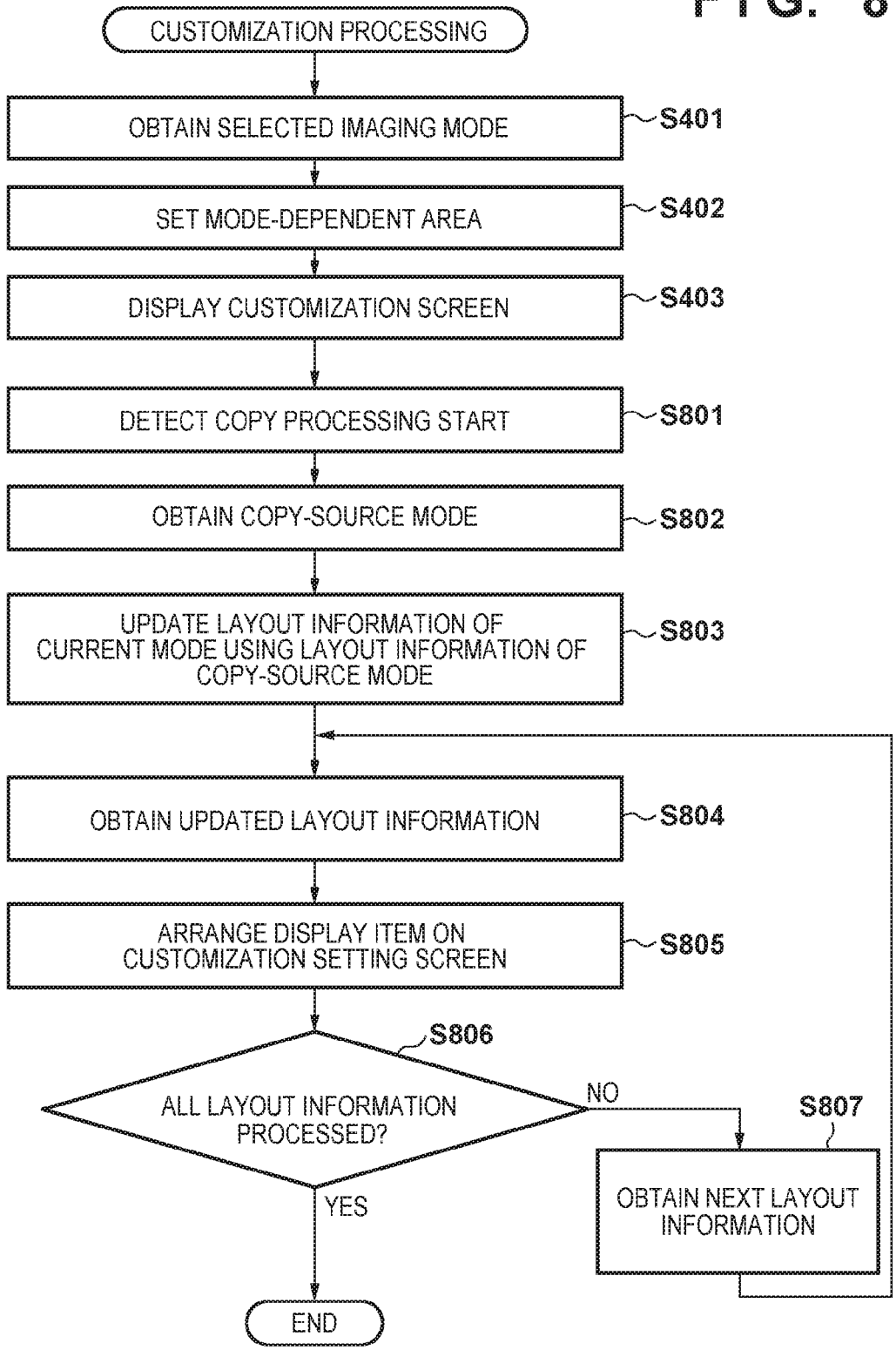
FIG. 8 is a flowchart for illustrating customization processing according to a second embodiment.

In FIG. 8, steps of performing processing similar to that of the first embodiment (FIG. 5) are denoted by the same reference numerals. In step S801, the system control unit 50 determines whether or not the user performed an operation for starting copying of items arranged in the mode-dependent area 204. For example, a copy start button is provided on the setting screen, and if the user operates the copy start button, the system control unit 50 starts copy processing. Note that the system control unit 50 uses the mode obtained in step S401 as the copy-destination mode.

When copy start is instructed, the processing moves from step S801 to step S802, and the system control unit 50 detects that a selection operation for the mode to be the copy-source was performed and stores the information of the mode to be the copy-source in the system memory 52. For example, in step S802, the system control unit 50 displays a list of selectable modes on the display unit 28 and allows the user to select a desired mode. The user uses the cross key 74, for example, to select the mode to be the copy-source from the list and presses the set button 75, and with this operation, the copy-source mode is selected.

In step S803, the system control unit 50 acquires the mode-dependent layout information corresponding to the copy-source mode obtained in step S802 and updates the layout information corresponding to the copy-destination mode (the mode obtained in step S401) using the obtained mode-dependent layout information. For example, in the case where the copy-source mode obtained in step S802 is the Av mode and the mode obtained in step S401 (copy-destination mode) is the AUTO mode, the layout information is updated as follows. For example, for the mode-dependent layout information 721 in FIG. 7, the system control unit 50 first deletes the layout information group 723 for the copy-destination mode (AUTO mode) and records a copy of the layout information group 722 for the copy-source mode (Av mode) as the layout information for the AUTO mode. Thus, the layout information for the copy-destination mode is updated with the layout information for the copy-source mode.

In step S804, the system control unit 50 sequentially obtains the layout information associated with the copy-destination mode updated in step S803. Then, in step S805, the system control unit 50 arranges and draws the display item designated by the layout information in the setting area indicated by the layout position. In step S806, the system control unit 50 determines whether or not drawing corresponding to all of the layout information is complete for the mode-dependent area 204 of the customization screen 201. If the drawing corresponding to all of the layout information is complete, the present processing ends, and if not, the processing moves to step S807. In step S807, the system control unit 50 obtains the next piece of layout information and repeats the processing of steps S804 to S806.

Note that in the description above, the operation menu was used to select whether to execute customization processing of the first embodiment or to execute customization processing by copying, according to the second embodiment, but there is no limitation to this. For example, a copy button may be provided on the customization screen shown in FIGS. 2A and 2C to 2F, and the copy processing of step S802 and onward may be activated by pressing the copy button.

As described above, with the second embodiment, it is possible to copy and use the setting state for the other mode in the customization of the mode-dependent area 204, and therefore in the case where a portion of the display items to be displayed are different between modes, the efficiency of operations for customization is improved.

Note that in the above-described embodiments, the selection of the setting area 202 on the customization screen 201 and the selection of the display items on the selection screen 211 are performed by operating the cross key 74 and pressing the set button 75, but there is no limitation to this. For example, it is possible to perform selection using a touch panel or the like. For example, in the case of using a touch panel, a desired area among the setting areas and display items displayed on the screen can be directly instructed.

Also, in the above-described embodiment, the layout position is selected on the customization screen 201, and thereafter the display item is selected using the selection screen 211 (steps S404 to S407), but there is no limitation to this. The layout position may be determined on the customization screen 201 after the display item is selected on the selection screen 211. Note that in this case, the display mode of the selection screen cannot be changed according to whether the same display targets are to be used in multiple modes or individual display targets are to be used. Also, in the above-described embodiment, 6×4 setting areas in the setting screen 301 and 6×4 setting areas in the customization screen 201 were used, but it goes without saying that there is no limitation to this.

In the description above, embodiments were described using the display processing of the digital camera 100, but the application of the present invention is not limited to a digital camera. For example, application is possible for any electronic apparatus that operates in multiple modes and has a setting screen that can be customized for each mode. That is, application is possible with an electronic apparatus according to which it is possible to perform customization on a screen of the user's preference, the electronic apparatus having multiple modes and being such that a portion of setting items to be displayed differ according to the mode.

Figure 9:
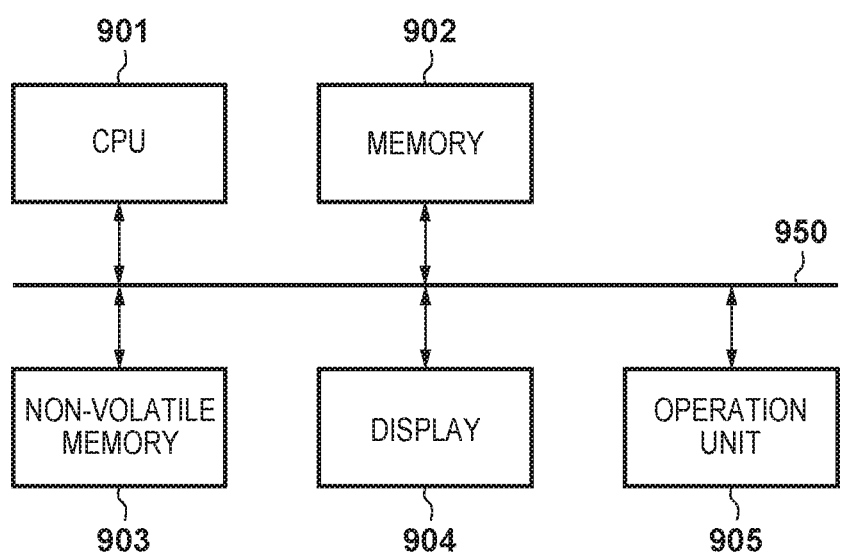
FIG. 9 is a block diagram showing an example of a configuration of an electronic apparatus.

FIG. 9 is a diagram showing an overall block configuration of such an electronic apparatus. In FIG. 9, a CPU 901, a memory 902, a non-volatile memory 903, a display 904, and an operation unit 905 are connected to an internal bus 950. The units connected to the internal bus 950 are configured to be able to perform data exchange with each other via the internal bus 950.

The memory 902 is composed of, for example, a RAM (a volatile memory using a semiconductor element, or the like). For example, in accordance with a program stored in the non-volatile memory 903, the CPU 901 uses the memory 902 as a work memory to control the units of the display control apparatus. Image data, audio data, other data, various types of programs to be operated by the CPU 901, and the like are stored in the non-volatile memory 903. The non-volatile memory 903 is constituted by a hard disk (HD), a ROM, or the like for example.

The display 904 displays images, a GUI screen that constitutes a GUI (Graphical User Interface), and the like based on control performed by the CPU 901. The CPU 901 generates a display control signal in accordance with the program and controls the units of the display control apparatus so as to generate a video image signal to be displayed on the display 904 and output the video image signal to the display 904. The display 904 displays a video image based on the output video image signal. The operation unit 905 is an input device for receiving a user operation, and includes buttons, dials, a joystick, a touch sensor, a touch pad, and the like. Note that a touch panel is an input device that overlaps with the display 904, is flat, and causes coordinate information corresponding to a contact position to be output.

In the above configuration, due to the CPU 901 executing the program stored in the memory 902, processing in accordance with the processing indicated by the flowcharts in FIGS. 4, 5, and 8 is realized, whereby an electronic apparatus with improved operability for customization processing is provided.

According to the above-described embodiments, even if a portion of the setting items to be displayed differ according to the mode, it is possible to create a screen customized to a user's preference.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-169722, filed Aug. 28, 2015, which is hereby incorporated by reference herein in its entirety.

What is claimed is:

1. An electronic apparatus, comprising:
a setting unit configured to set a display item to be displayed on a setting screen;
a mode setting unit configured to set a mode from among a plurality of modes; and
a display control unit configured to display the setting screen in accordance with the mode set by the mode setting unit and the display item set by the setting unit,
wherein the setting screen has a first area for displaying display items that differ for each mode, and a second area for displaying display items that are displayed in a plurality of modes.

2. The apparatus according to claim 1, wherein
the first area and the second area are displayed simultaneously on a display screen for displaying the setting screen.

3. The apparatus according to claim 1, further comprising
a change unit configured to change a size of the first area and the second area according to a user instruction.

4. The apparatus according to claim 1, wherein
when a display item for the first area is to be set, the setting unit causes a display item related to the selected mode to be set with priority, and when a display item for the second area is to be set, the setting unit causes a display item independent of the mode to be set with priority.

5. The apparatus according to claim 1, wherein
the setting unit can set a display position for a display item displayed on the setting screen.

6. The apparatus according to claim 1, further comprising
a recording unit configured to record a display item set so as to be displayed in the first area by the setting unit in association with a mode selected as a customization target, and record a display item set so as to be displayed in the second area by the setting unit as a common display item.

7. The apparatus according to claim 6, wherein
the display control unit causes the display item recorded in the recording unit in association with the mode set by the mode setting unit and the display item recorded in the recording unit as the common display item to be displayed as a list on the setting screen.

8. The apparatus according to claim 6, wherein
on a customization screen including the first area and the second area, the setting unit receives a user designation of a display item and a layout position of the display item.

9. The apparatus according to claim 8, wherein
if the layout position designated by the user on the customization screen is in the first area, the recording unit records the display item designated by the user in association with the selected mode, and if the layout position designated by the user is in the second area, the recording unit records the display item designated by the user as a common display item.

10. The apparatus according to claim 9, wherein
the setting unit provides a selection screen that allows the user to select one of multiple display items as a display item to be arranged on the customization screen.

11. The apparatus according to claim 10, wherein
the selection screen is displayed in response to the user selecting a layout position on the customization screen.

12. The apparatus according to claim 11, wherein
the selection screen displays a plurality of display items that can be selected by a user as a list, and
changes an order or content of the display items displayed in the list in accordance with whether the layout position selected by the user is in the first area or in the second area.

13. The apparatus according to claim 12, wherein
if the layout position selected by the user is in the second area, the selection screen changes the order or content of the display items displayed in the list in accordance with the selected mode.

14. The apparatus according to claim 8, wherein
the layout position of the display item on the customization screen corresponds to the layout position of the display item on the setting screen.

15. The apparatus according to claim 6, wherein
the recording unit
records layout information indicating the display item set so as to be displayed in the first area and the layout position of the display item in the memory for each mode, and
records layout information indicating the display item set so as to be displayed in the second area and the layout position of the display item in the memory as common layout information.

16. The apparatus according to claim 15, further comprising
a copy unit configured to copy the layout information recorded in association with a copy-source mode in response to an instruction to copy from the copy-source mode to a copy-destination mode given via the setting screen, and store the copied layout information as layout information for the copy-destination mode.

17. The apparatus according to claim 6, further comprising
a selection unit configured to allow a user to select a mode to be a customization target from the plurality of modes.

18. The apparatus according to claim 17, further comprising
a change unit configured to, if another mode is selected by the selection unit, change the setting screen that is the customization target to a setting screen for the other mode.

19. An image capturing apparatus comprising:
a setting unit configured to set a display item to be displayed on a setting screen;
a mode setting unit configured to set an imaging mode from among a plurality of imaging modes; and
a display control unit configured to display the setting screen in accordance with the imaging mode set by the mode setting unit and the display item set by the setting unit,
wherein the setting screen has a first area for displaying display items that differ for each imaging mode, and a second area for displaying display items that are displayed in a plurality of imaging modes.

20. A control method for an electronic apparatus, comprising:

setting a display item to be displayed on a setting screen;
setting a mode from among a plurality of modes; and
displaying the setting screen in accordance with the mode set in the mode setting and the display item set in the setting,
wherein the setting screen has a first area for displaying display items that differ for each mode, and a second area for displaying display items that are displayed in a plurality of modes.

21. A computer readable medium storing a program for causing a computer to execute a method of controlling an electronic apparatus, the control method comprising:
setting a display item to be displayed on a setting screen;
setting a mode from among a plurality of modes; and
displaying the setting screen in accordance with the mode set in the mode setting and the display item set in the setting,
wherein the setting screen has a first area for displaying display items that differ for each mode, and a second area for displaying display items that are displayed in a plurality of modes.

* * * * *